United States Patent
Cheng et al.

(10) Patent No.: US 8,390,743 B2
(45) Date of Patent: Mar. 5, 2013

(54) SYSTEM AND METHODS FOR THE SYNCHRONIZATION AND DISPLAY OF VIDEO INPUT SIGNALS

(75) Inventors: Hown Cheng, Cupertino, CA (US); Do Hwan Lim, San Jose, CA (US); Byungdae Jeong, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 13 days.

(21) Appl. No.: 13/222,111

(22) Filed: Aug. 31, 2011

(65) Prior Publication Data

US 2012/0249875 A1 Oct. 4, 2012

Related U.S. Application Data

(60) Provisional application No. 61/470,206, filed on Mar. 31, 2011.

(51) Int. Cl.
*H04N 7/14* (2006.01)
*H04N 9/64* (2006.01)
*H04N 7/18* (2006.01)
*H04N 9/74* (2006.01)

(52) U.S. Cl. ............ 348/716; 348/14.07; 348/153; 348/159; 348/588

(58) Field of Classification Search ............ 348/153, 348/159, 14.08, 14.09, 598, 383, 588, 565, 348/705, 706, 500, 714–716, 718, 719, 36, 348/14.07; 345/1.3; 715/781, 792
See application file for complete search history.

(56) References Cited

U.S. PATENT DOCUMENTS

| | | | |
|---|---|---|---|
| 5,442,406 A | * | 8/1995 | Altmanshofer et al. ...... 348/588 |
| 5,517,253 A | * | 5/1996 | De Lange ..................... 348/513 |
| 5,642,498 A | | 6/1997 | Kutner |
| 5,777,687 A | | 7/1998 | De Lange |
| 5,870,139 A | | 2/1999 | Cooper et al. |
| 5,914,757 A | | 6/1999 | Dean et al. |
| 5,995,140 A | | 11/1999 | Cooper et al. |
| 6,025,874 A | | 2/2000 | Cooper et al. |
| 6,147,717 A | | 11/2000 | Jun |
| RE37,508 E | | 1/2002 | Taylor et al. |
| 6,384,868 B1 | | 5/2002 | Oguma |

(Continued)

FOREIGN PATENT DOCUMENTS

WO    WO0135640    5/2001

OTHER PUBLICATIONS

"Intersil Techwell Security Surveillance ICs", "Intersil Selection Guide", Q4 2010, pp. 1-12, Publisher: Intersil Techwell.

(Continued)

*Primary Examiner* — Victor Kostak
(74) *Attorney, Agent, or Firm* — Fogg & Powers LLC (57) ABSTRACT

Systems and methods for the synchronization and display of video input signals. The input signals, associated with input channels, are received by a controller. On a frame-by-frame basis, the controller controls the writing of the input signals to, and the reading of the input signals from, a memory. A frame rate control module controls frame-level synchronization between the writing operations and reading operations of the controller so that when a frame is written to the memory is not simultaneously read from the memory. The controller writes video frames for each input channel to, and reads video frames for each input channel from, the memory on a channel-by-channel basis such that the video frames corresponding to each input channel are read and written independently of one another. This allows the input signals to be unsynchronized with one another without harming the writing operations, reading operations, and display of the input signals.

20 Claims, 8 Drawing Sheets

U.S. PATENT DOCUMENTS

| | | | |
|---|---|---|---|
| 6,526,430 B1* | 2/2003 | Hung et al. | 708/523 |
| 6,963,353 B1* | 11/2005 | Firestone | 348/14.09 |
| 7,103,668 B1 | 9/2006 | Corley et al. | |
| 2002/0033828 A1* | 3/2002 | Deering et al. | 345/502 |
| 2005/0024369 A1* | 2/2005 | Xie | 345/547 |
| 2005/0200764 A1* | 9/2005 | Tsuruta et al. | 348/716 |
| 2005/0265699 A1 | 12/2005 | Chiba et al. | |
| 2008/0066119 A1* | 3/2008 | Schieltz et al. | 725/80 |
| 2010/0064091 A1* | 3/2010 | Futenma et al. | 711/5 |

OTHER PUBLICATIONS

"TW2864 4-Channel Video Decoder and Audio Codec for Security Applications", "Security Surveillance IC Solutions", 2007, pp. 1-2, Publisher: Intersil Techwell.

* cited by examiner

SYSTEM AND METHODS FOR THE SYNCHRONIZATION AND DISPLAY OF VIDEO INPUT SIGNALS

RELATED APPLICATIONS

This application claims the benefit of prior-filed, U.S. Provisional Patent Application No. 61/470,206, filed Mar. 31, 2011, the entire content of which is hereby incorporated by reference. This application is also related to U.S. patent application Ser. No. 13/222,105, filed on the same date herewith.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to the synchronization and display of a plurality of video input signals from a plurality of input channels. The video input signals associated with each of the channels are received by a controller or another suitable processing device. The controller is configured to, among other things, control the writing of the video input signals to a memory and control the reading of the video input signals from the memory. The reading and writing of the video input signals is performed on a frame-by-frame basis. Frame-level synchronization between the writing operations and reading operations is controlled or regulated by a frame rate control module to ensure that, for example, a frame that is being written to the memory is not simultaneously trying to be read from the memory. Additionally, the controller writes video frames for each input channel to, and reads video frames for each input channel from, the memory on a channel-by-channel basis. As such, the video frames corresponding to each input channel are read and written independently of one another. This allows the video input signals to be unsynchronized with respect to one another without harming the writing operations, reading operations, and eventual mapping of the video input signals to the display. Additionally, the video frames corresponding to each input channel are stored at locations within the memory that correspond to a location within an output display. For example, the output display can be divided into a plurality of sections corresponding to the number of input channels, and an appropriate amount of storage is allocated in the memory to write each input channel's video frames to specific memory locations. When frames from the allocated memory locations are read by the controller, the frames are mapped and displayed at the corresponding location within the display.

Figure 1:
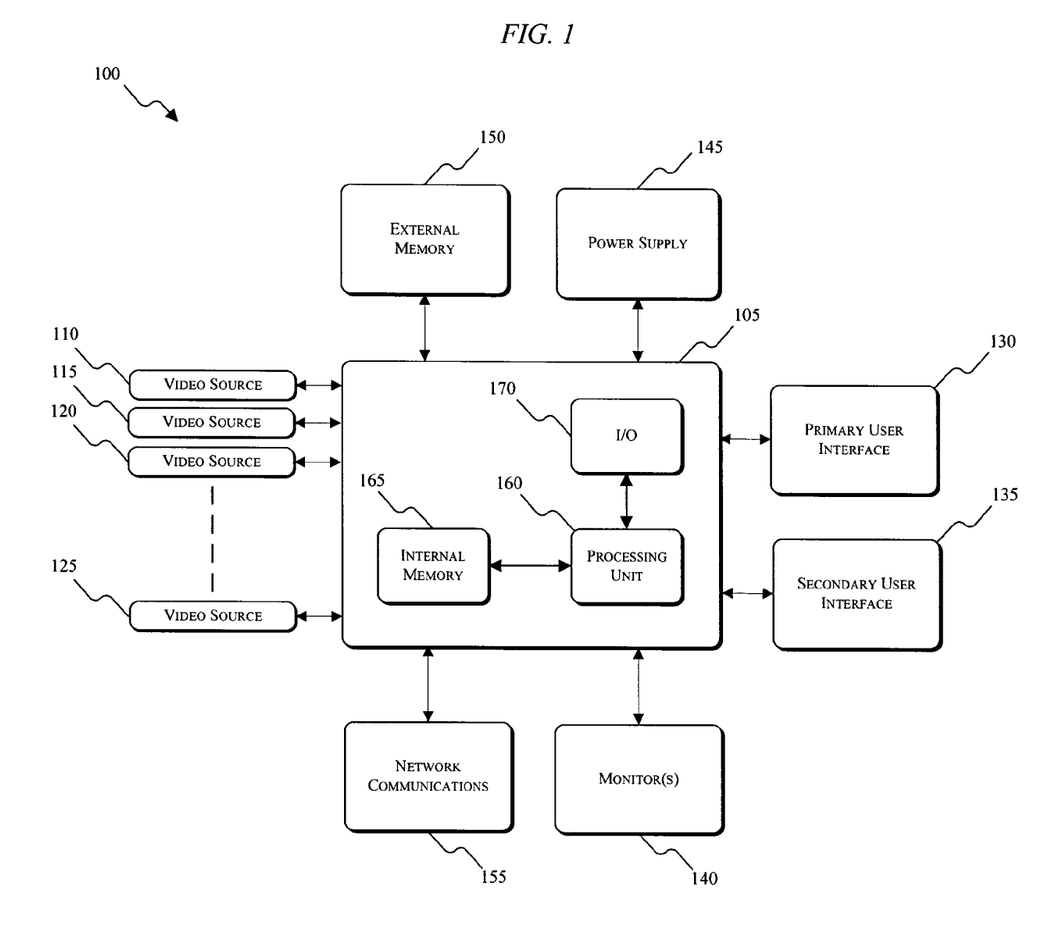
FIG. 1 illustrates a video system according to an embodiment of the invention.

FIG. 1 illustrates a video system 100 (e.g., for security applications, multi-channel digital video recorder ["DVR"] applications, etc.) that includes a controller 105 and a plurality of video sources 110-125. The controller 105 is electrically and/or communicatively connected to the video sources 110-125, as well as a variety of additional modules or components of the video system 100. For example, the illustrated controller 105 is connected to a primary user interface module 130, a secondary user interface module 135, one or more monitors 140, a power supply module 145, one or more external memory modules 150, and a network communications module 155. The controller 105 includes combinations of software and hardware that are operable to, among other things, receive and process video input signals, control information and data provided to the primary user interface module 130, the secondary user interface module 135, the one or more monitors 140, etc. In some constructions, the controller 105 includes a plurality of electrical and electronic components that provide power, operational control, and protection to the components and modules within the controller and/or video system. For example, the controller 105 includes, among other things, a processing unit 160 (e.g., a microprocessor, a microcontroller, or another suitable programmable device), an internal memory 165, and an input/output ("I/O") system 170. The controller 105 also includes one or more write control modules, one or more read control modules, and one or more frame rate control modules, as shown and described below with respect to FIGS. 2 and 3. In some constructions, the controller 105 is implemented partially or entirely on a semiconductor (e.g., a field-programmable gate array ["FPGA"] semiconductor) chip, such as a chip developed through a register transfer level ("RTL") design process. As an illustrative example, the controller 105 can be an advanced multi-channel HD display/record/playback controller integrated circuit ("IC").

The internal memory 165 and/or external memory 150 include, for example, a read-only memory ("ROM"), a random access memory ("RAM") (e.g., dynamic RAM ["DRAM"], synchronous DRAM ["SDRAM"], etc.), an electrically erasable programmable read-only memory ("EEPROM"), a flash memory, a hard disk, an SD card, or another suitable magnetic, optical, physical, or electronic memory device. The processing unit 160 is connected to the internal memory 165 and executes software that is capable of being stored in a RAM of the internal memory 165 (e.g., during execution), a ROM of the internal memory 165 (e.g., on a generally permanent basis), or another non-transitory computer readable medium such as another memory or a disc.

In some embodiments, the controller 105 or network communications module 155 includes one or more communications ports (e.g., Ethernet, serial advanced technology attachment ["SATA"], universal serial bus ["USB"], integrated drive electronics ["IDE"], etc.) for transmitting, retrieving, or storing video frames or information related to the video system to one or more devices external to the controller 105. Software included in the implementation of the video system 100 can be stored in the memory 165 of the controller 105. The software includes, for example, firmware, one or more applications, program data, one or more program modules, and other executable instructions. The controller 105 is configured to retrieve from memory and execute, among other things, instructions related to the control processes and methods described herein. In other constructions, the controller 105 includes additional, fewer, or different components. In some constructions, the controller 105 can be implemented as any of a variety of devices capable of receiving and processing video input signals from one or more input channels. For example, the controller 105 (e.g., an FPGA semiconductor chip) is used with an embedded 8/16 channel DVR, a hybrid HD DVR, an HD video multiplexer, a network video recorder, a television (e.g., a smart TV), a smart phone, a personal computer ("PC"), a tablet PC, a laptop computer, a personal digital assistant ("PDA"), or a server. Additionally or alternatively, the controller 105 is incorporated into a device that is separate from and connectable (e.g., physically, electrically, communicatively, etc.) to the devices described above.

The power supply module 145 supplies a nominal AC or DC voltage to the controller 105 or other components or modules of the video system 100. The power supply module 145 is powered by, for example, mains power having nominal line voltages between 100V and 240V AC and frequencies of approximately 50-60 Hz. The power supply module 145 is also configured to supply lower voltages to operate circuits and components within the controller 105 or video system 100. In other constructions, the controller 105 or other components and modules within the video system 100 are powered by one or more batteries or battery packs, or another grid-independent power source (e.g., a generator, a solar panel, etc.).

The primary user interface module 130, the secondary user interface module 135, and the one or more monitors 140 are used to monitor the video system 100 in substantially real-time or based on recorded video. For example, the primary user interface module 130, the secondary user interface module 135, and the one or more monitors 140 are operably coupled to the controller 105 to receive live or substantially real-time video feeds from the plurality of video sources 110-125, to receive recorded video feeds from the plurality of video sources 110-125 or memory 150, etc. The primary user interface module 130, the secondary user interface module 135, and the one or more monitors 140 can include a combination of digital and analog input or output devices required to achieve a desired level of control and monitoring for the video system 100. For example, the primary user interface module 130, the secondary user interface module 135, and the one or more monitors 140 can each include a display (i.e., a primary display for the primary user interface module, a secondary display for the secondary user interface module, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, or the like. The display is configured to display one or more video feeds received from the controller 105. The video feeds can correspond to any of a variety of formats or resolutions including common intermediate format ("CIF"), video graphics array ("VGA"), composite video ("CVBS"), red green blue ("RGB"), high-definition multimedia interface ("HDMI"), BT.1120 ("1080i"), D1, etc. The primary user interface module 130, the secondary user interface module 135, and the one or more monitors 140 can also be configured to display conditions or data associated with the video system in real-time or substantially real-time (e.g., as an on-screen display ["OSD"]). For example, the primary user interface module 130 is configured to display the status or characteristics of the video system, time stamps, etc.

In some embodiments, the information and data (e.g., video frames) associated with the operation and status of the video system 100 are sent, transferred, or transmitted using the network communications module 155 to a remote or mobile processing and storage device 800 (see FIG. 9) for remote monitoring, remote control, data logging, etc. The remote device is, for example, a personal computer, a laptop computer, a mobile phone, tablet computer, personal digital assistant ("PDA"), a server, a database, or the like. In some implementations, the data is transferred via a wireless local area network ("LAN"), a neighborhood area network ("NAN"), a home area network ("HAN"), or a personal area network ("PAN") using any of a variety of communications protocols, such as Wi-Fi, Bluetooth, ZigBee, or the like. Additionally or alternatively, the data is transferred to the remote or mobile device over a wide area network ("WAN") (e.g., a TCP/IP based network, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a Digital Enhanced Cordless Telecommunications ("DECT") network, a Digital AMPS ("IS-136/TDMA") network, an Integrated Digital Enhanced Network ("iDEN"), a Digital Advanced Mobile Phone System ("D-AMPS") network, etc.).

Figure 9:
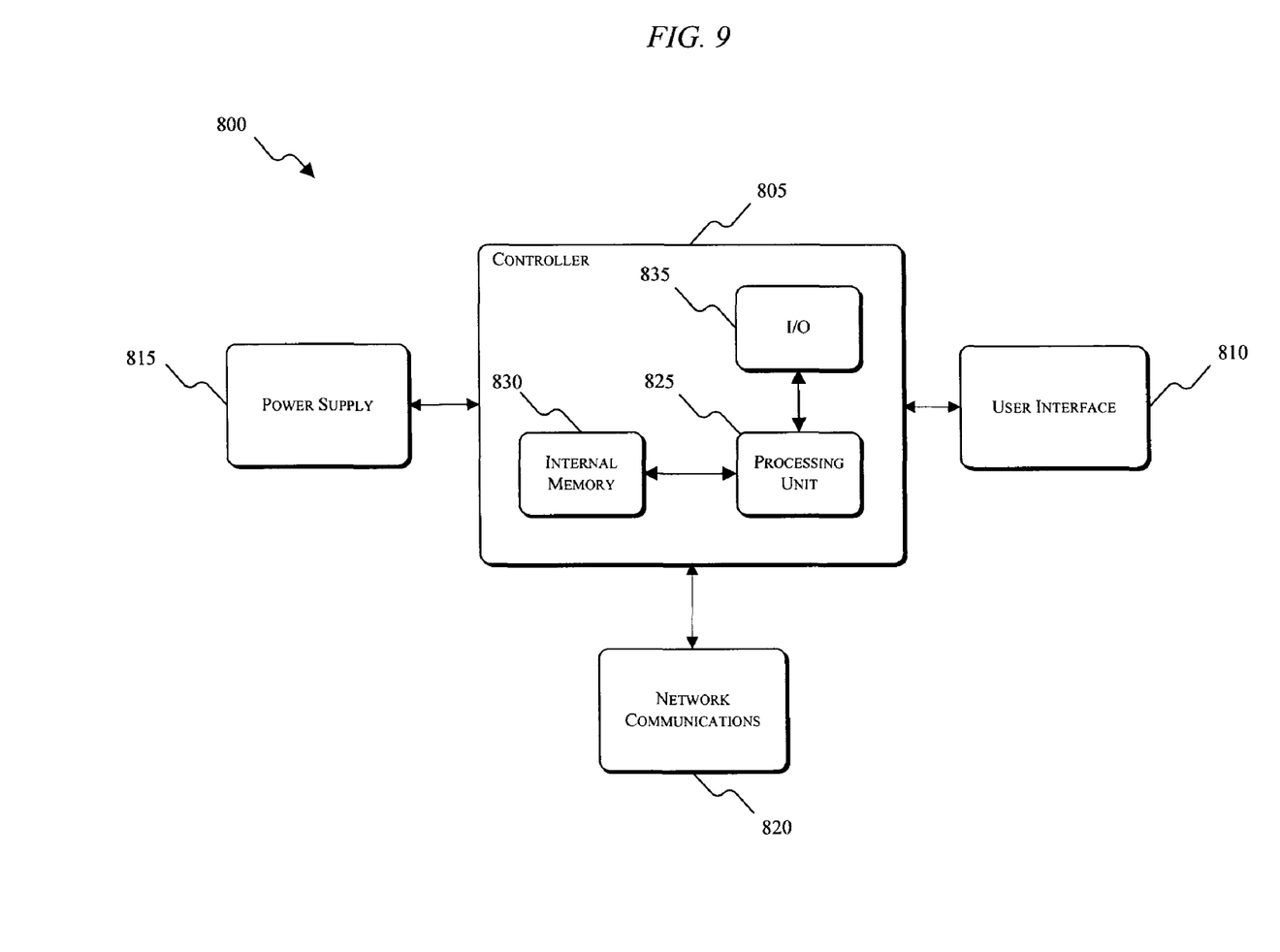
FIG. 9 illustrates a remote processing and storage device according to an embodiment of the invention.

The remote or mobile device 800 can include, for example, a separate controller 805, a user interface module (e.g., a display) 810, a power supply module 815, and a communications module 820 which operate in a similar manner to corresponding components of the video system 100 described above. The remote device 800 also includes combinations of hardware and software that are operable to, among other things, control the operation of the video system 100, control the information that is presented on the display, etc. For example, the controller 805 includes a processing unit 825 (e.g., a microprocessor, a microcontroller, or another suitable programmable device), an internal memory 830, and an input/output ("I/O") system 835. The information received from the video system 100 can be received through the communications module 820 which includes one or more antennas, one or more network interface cards ("NICs"), or the like for communicating over one or more of the networks described above.

Figure 2:
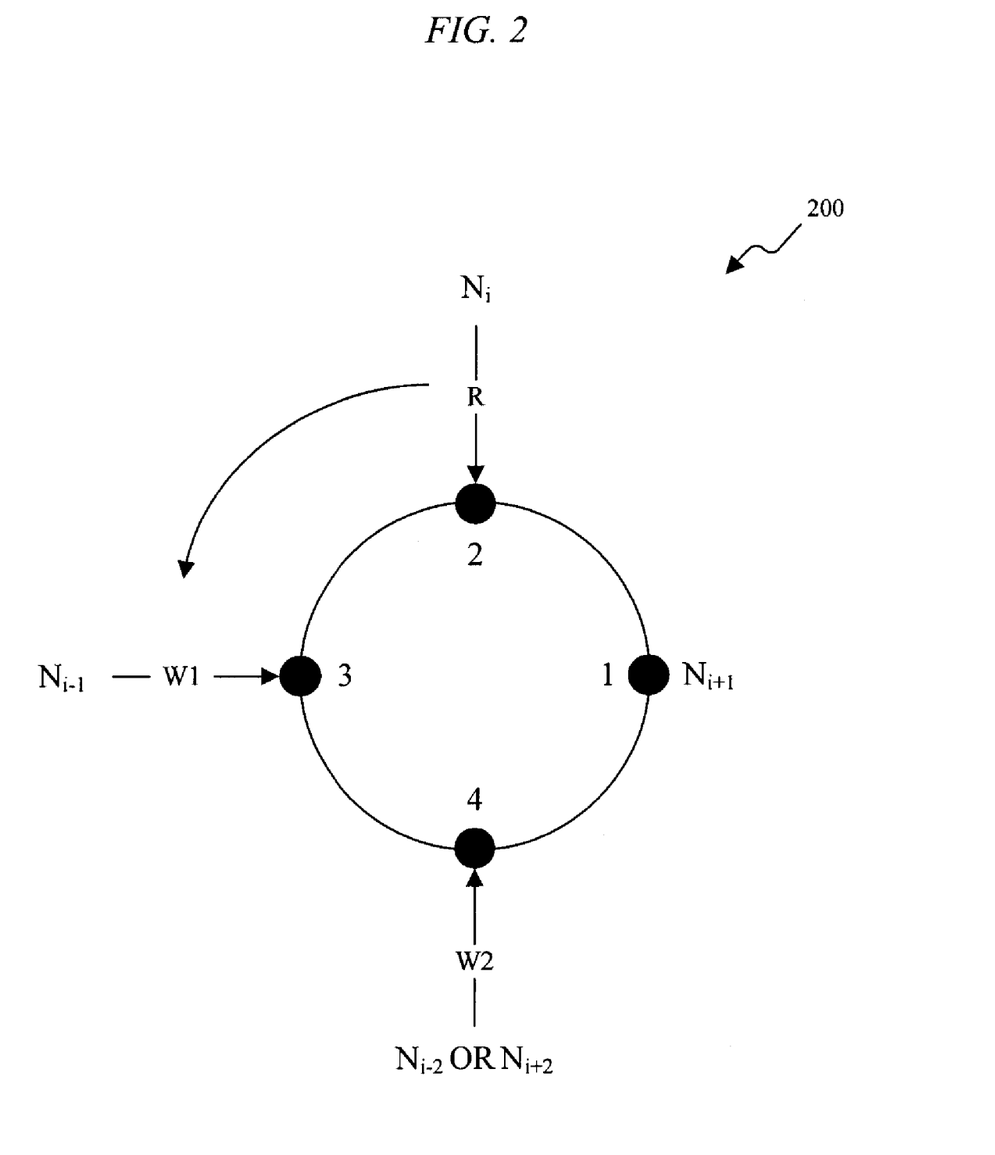
FIG. 2 is a frame synchronization diagram according to an embodiment of the invention.

FIG. 2 is a diagram 200 that illustrates the operation of one of the one or more frame rate control modules within the controller 105. The frame rate control module is configured for use with, for example, both the read and write operations associated with the video system 100. With respect to the read operation (i.e., for substantially real-time display of a plurality of video input signals), each channel includes full video frames stored in, for example, the memory 150 (e.g., SDRAM). In some embodiments, four full video frames are stored in the memory 150 for each input channel, and/or less than full video frames are stored in the memory 150 for each input channel. In other embodiments, a different number of full video frames are stored in the memory 150 (e.g., more than four full video frames) for each input channel. The frame rate control module is configured to control and monitor the locations of a read pointer and a write pointer. The read pointer and the write pointer are used to determine which memory addresses or blocks of memory addresses are read from (i.e., by a read control module) or written to (i.e., by one or more write control module), respectively. In some embodiments, a single write pointer and a single read pointer are included in the controller, or a write pointer for each input channel and a single read pointer are included in the controller. In other embodiments, each input channel includes a read pointer and a write pointer to control which of the memory locations associated with the input channel have a frame being written and which have a frame being read out. The frame rate control module uses the locations of the read pointer and the write pointer to ensure that the frame that is being read from the memory 150 is a predetermined number of frames (e.g., memory locations) away from a frame that is being written to memory. For example, an error or fault may occur if the controller attempts to read a frame from the memory 150 that is concurrently being written to the memory 150. As such, the frame rate control module controls the locations of the read pointer and the write pointer with respect to one another such that the simultaneous reading and writing of a frame does not occur (i.e., the read pointer and the write pointer do not overlap). Additionally, because the frame rate control module controls the read pointer and the write pointer, the frame rate of read and displayed video signals can be readily increased or decreased.

With reference to FIG. 2, a circular buffer configuration corresponding to one or more input channels is illustrated. In the illustrated embodiment, the circular buffer corresponds to four address locations or blocks of addresses in the memory 150. These memory locations are designated by the numbers 1, 2, 3, and 4. The address locations are also given the temporal designations $N_i$, $N_{i+1}$, $N_{i-1}$, and $N_{i-2}$ which signify time relationships with respect to a current read operation. The symbol 'R' indicates which of the address locations is being read from the memory 150, and the symbols 'W1' and 'W2' indicate address locations where video frames have been written to the memory 150. When writing a video frame to the memory 150, each video frame is written to a corresponding memory location on a line-by-line basis. When the writing of the video frame is completed, a new video frame will be written based on signals received from a frame rate control module. If a new video frame cannot be written, the previous video frame may be rewritten, the new video frame may be skipped, etc. At time $N_i$, the controller is reading a frame located at memory location 2. The frame that is read out from the memory 150 is a frame that was previously written to the memory 150. After the frame at time $N_i$ and memory location 2 has been read from memory, the frame rate control module advances the read pointer to the next frame (i.e., at time $N_{i-1}$ and memory location 3) which was written to the memory 150 subsequent to the frame at time $N_i$ and memory location 2. Once the frame at time $N_{i-1}$ and memory location 3 has been read from the memory 150, the frame rate control module advances the read pointer to the frame stored at time $N_{i-2}$ and memory location 4. The frame stored at time $N_{i-2}$ and memory location 4 was stored subsequent to the frame stored at time $N_{i-1}$ and memory location 3. The frame rate control module continues to control which frames are read from the memory 150 based on a relationship between the read pointer and the write pointer such that, for example, the frame being read from the memory 150 remains at least one frame (e.g., two frames) behind the frame being written to the memory 150.

Figure 3:
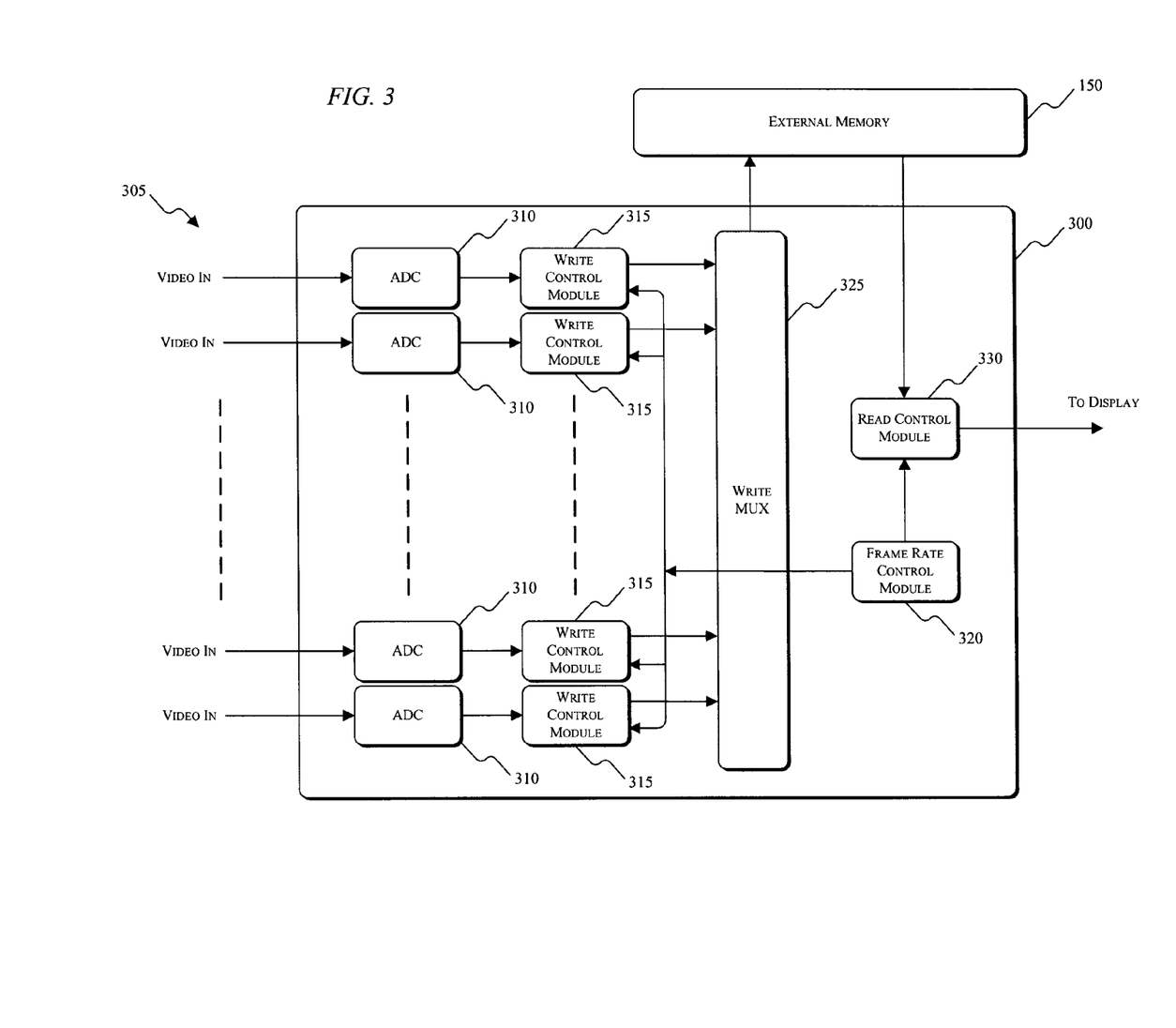
FIG. 3 illustrates a controller according to an embodiment of the invention.

FIG. 3 illustrates a controller 300 for controlling the synchronization of writing and reading operations of a plurality of video input signals. A plurality of video input signals 305 are received by the controller 300 as, for example, analog signals according to a format such as BT.601. The analog input signals are converted to a digital video protocol such as BT.656 for streaming uncompressed phase alternating line ("PAL") or National Television System Committee ("NTSC") signals using a plurality of analog-to-digital converters ("ADCs") 310. The outputs of the ADCs 310 are provided or transmitted to write control modules 315. The write control modules 315 include, for example, first-in-first-out ("FIFO") queues or buffers. The write control modules 315 receive control signals from a frame rate control module 320 related to, among other things, an address location in memory for storing a frame of the video input signals. Although the illustrated embodiment of the controller 300 includes a single frame rate control module, in some embodiments, the controller 300 includes a plurality of frame rate control modules (e.g., one frame rate control module for each input channel). The use of a plurality of frame rate control modules can allow the display of video frames corresponding to each input channel to be controlled independently. For example, the display of video frames corresponding to a single input channel can be paused without affecting the display of other video frames, recorded video frames corresponding to a single input channel can be replayed without affecting the substantially real-time display of the video frames from the remaining input channels, etc. In some embodiments, the output video frames are output to a single display in formats such as, for example, NTSC, PAL, NTSC and PAL, etc.

The write control modules 315 provide video frames corresponding to the video input signals to the write multiplexer ("MUX") 325 for subsequent writing to the memory 150 (e.g., SDRAM). The video frames are stored at address locations in the memory 150 that correspond to a position within an output display for the video system. For example, the address locations correspond to a location within a display of the primary user interface 130, the secondary user interface 135, or the one or more monitors 140. For each of the video input signals, a predetermined or selected amount of memory or number of addresses are allocated in the memory 150 to store the frames of the video input signals from each input channel. The frames of the video input signals are stored on a per-channel basis. For example, four frames of a first video input signal are stored in four corresponding address blocks in the memory 150. When a new frame from the video input signal is received, one of the address blocks is written or rewritten with the new frame from the video input signal. In some embodiments, the four address blocks within the memory 150 are continuously rewritten when video input signals from the corresponding channel are being received. In other embodiments, different numbers of address blocks are used (e.g., 2, 3, 5, 6, etc.). Because the video frames are stored on a per-channel basis, one video frame corresponding to each video input signal is continually being written to the memory 150, or one video frame corresponding to each video input signal is continually waiting to be overwritten (e.g., when all of the video frames from the input video signals are written serially to the memory 150). In some embodiments, frame rate interpolation is used to generate intermediate video frames between two received video frames. For example, frame rate interpolation may be used during the synchronization of the plurality of video input signals when a video input signal has a lower frame rate than other video input signals, to reduce or eliminate the presence of artifacts, etc.

A read control module 330 reads the stored frames for each video input signal and provides the retrieved video frame to a display. Like the write control modules 315, the read control module 330 receives signals from the frame rate control module 320. The signals provided to the read control module 330 from the frame rate control module 320 control the manner in which the read control module 330 reads video frames from the memory 150. As previously described, the frame that is being read from memory is different than the frame that is being written to the memory 150. In some embodiments, the frame being read from the memory 150 (i.e., corresponding to the location of the read pointer) is maintained two frames away from a frame that is currently being written to the memory 150 (i.e., corresponding to the location of the write pointer). In other embodiments, the frame being read from the memory 150 is maintained at least one frame away from the frame that is currently being written to the memory 150, or more than two frames away (e.g., in an embodiment in which more than four frames for a given input channel are stored in the memory 150).

Figure 4:
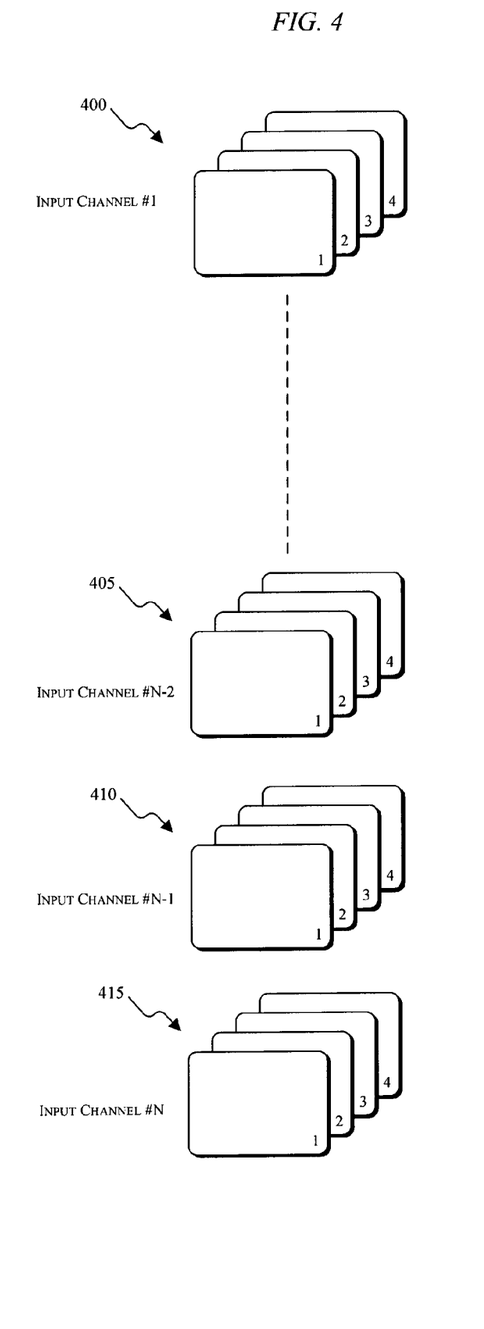
FIG. 4 illustrates a plurality of video frames corresponding to a plurality of input channels.

As a further illustration of the synchronization between the video frame writing and reading operations, FIG. 4 illustrates a first set of video frames 400 for a first input channel, a second set of video frames 405 for a second input channel, a third set of video frames 410 for a third input channel, and a fourth set of video frames 415 for a fourth input channel. Although only four input channels are illustrated, the 'N' identifier is used to illustrate that any number of input channels may be present (e.g., 16 input channels, etc.). In the illustrated embodiment, each of the input channels includes four stored video frames. Each video frame corresponds to a memory location (e.g., an address location, block of address locations, etc.) allocated for a specific input channel. As described above, the writing of video frames to the memory 150 is controlled by the write control modules 315, a write pointer, and the frame rate control module 320. In some embodiments, the video frames are written to the memory sequentially based on the input channel (e.g., input channel #1 frame #1, input channel #N−2 frame #1, input channel #N−1 frame #1, etc.). In other embodiments, the video frames are written to the memory based on a channel-by-channel basis (e.g., input channel #1 frame #1, input channel #1 frame #2, input channel #1 frame #3, etc.). In such embodiments, the controller 300 may include multiple frame rate control modules.

Figure 5:
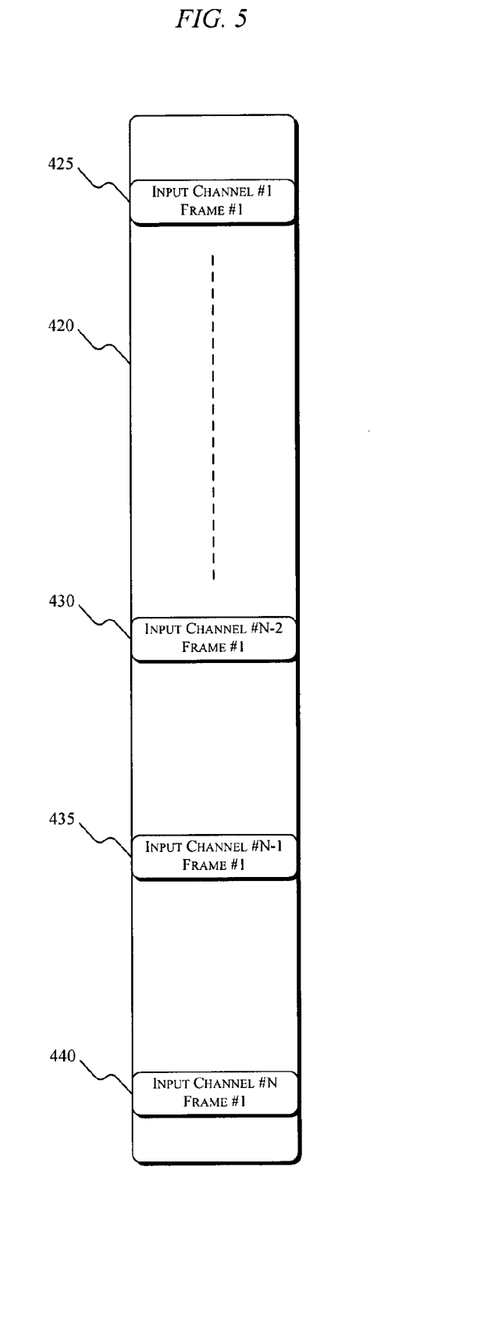
FIG. 5 illustrates an output of a read control module according to an embodiment of the invention.

The video frames stored in the memory 150 as described above are related to the order in which the video frames are read from the memory 150. For example, FIG. 5 illustrates an output stream 420 of video frames that includes a plurality of stored video frames. In the illustrated embodiment, the stored video frames from FIG. 4 are read out in the following order: input channel #1 frame #1 425; input channel #N−2 frame #1 430; input channel #N−1 frame #1 435; input channel #N frame #1 440, etc., based on the location of the read pointer, as described above. In embodiments of the invention in which the video frames are written to the memory based on a channel-by-channel basis (e.g., input channel #1 frame #1, input channel #1 frame #2, input channel #1 frame #3, etc.), the read pointer can be controlled with respect to a write pointer for each input channel. For example, video frame #1 of a first input channel may be read from memory following video frame #3 of a different input channel. As such, instead of the frame rate control module monitoring a single read pointer and a single write pointer, the frame rate control module may be monitoring a plurality of write pointers and one or more read pointers. As described in greater detail below, the order in which the video frames are read from memory 150 is also related to a display location of the video frame within a display.

Figure 6:
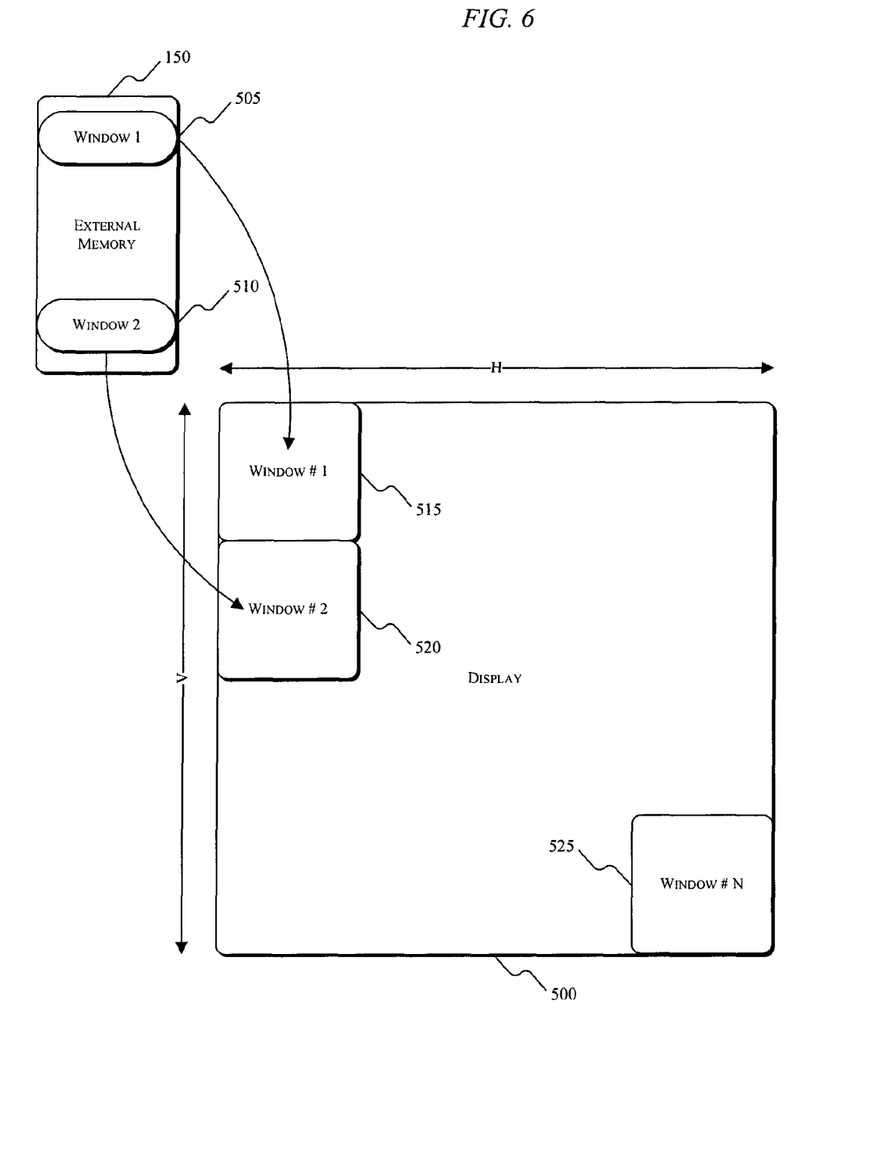
FIG. 6 illustrates a display according to an embodiment of the invention.

As an illustrative example, FIG. 6 illustrates a manner in which stored video frames are mapped to and displayed on a display 500 of the video system 100. As described above, the frames associated with a particular input channel or video input source are stored in predetermined or selected locations (e.g., window #1 505, window #2 510, etc.) within the memory 150. These locations correspond to positions within a display of the video system. For example, the display 500 illustrated in FIG. 6 includes dimensions of 'H' and 'V'. The dimensions of the display 500 are such that the display 500 is capable of simultaneously displaying a frame from each of the input channels to the video system without artifacts. For example, if the video system includes sixteen input channels, the display can include sixteen sections or windows in which to map and display stored video frames. The display is divided into a number of different windows, and each window corresponds to a location or locations within the memory. As video frames are read out from the memory 150 by the read control module 330, the retrieved frame is provided to the display 500. The video system can be considered a multi-in-single-out ("MISO") system in that the plurality of input channels and corresponding video sources are read from the memory 150 one frame at a time. The frame corresponding to, for example, the first (e.g., numerically) input channel is displayed in display window #1 515, the second input channel is displayed in display window #2 520, the Nth input channel is displayed in display window #N 525, etc. In some embodiments, each frame is read from the memory 150 sequentially based on the window number. In other embodiments, each frame is read from the memory 150 based on other criteria, such as the frequency of the video input source, the quality of the video input source, etc.

Figure 7:
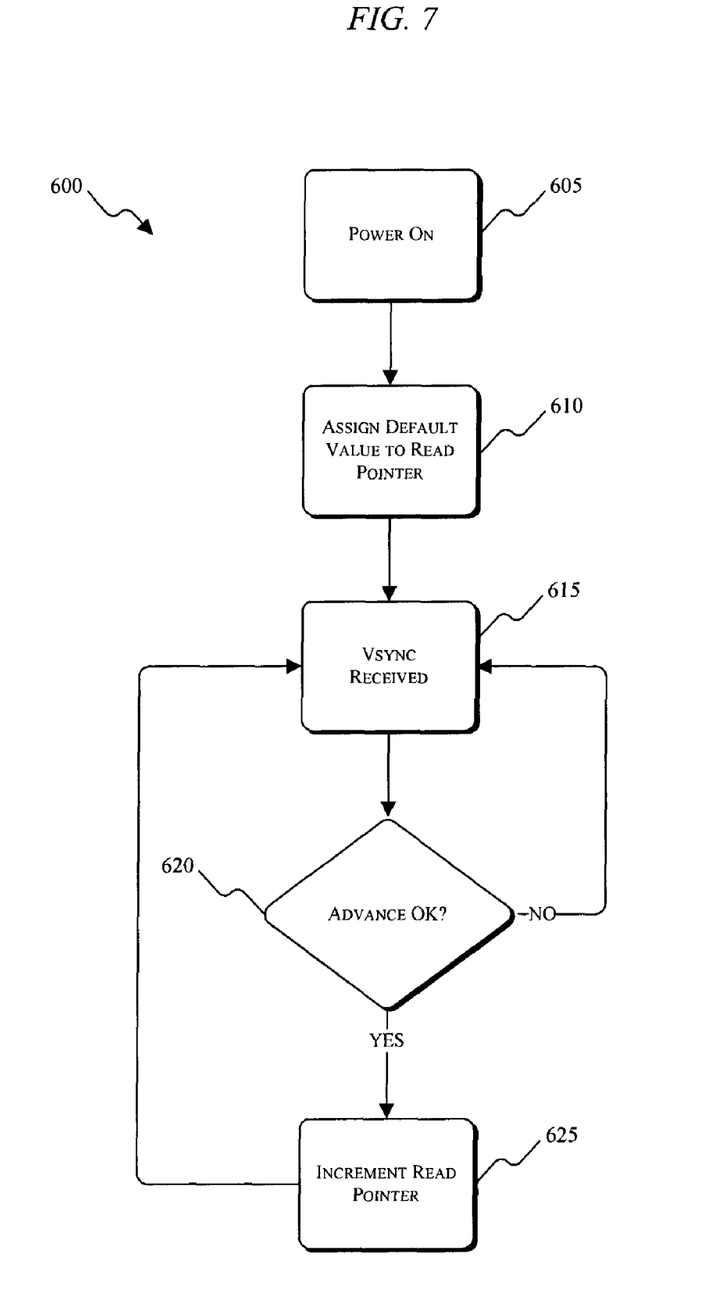
FIG. 7 illustrates a read process according to an embodiment of the invention.

FIG. 7 is a process 600 for reading a video frame from memory. Various steps described herein with respect to the process 600 are capable of being executed simultaneously or in an order that differs from the illustrated serial manner of execution. The process 600 begins at power on or startup (step 605). For descriptive purposes, the memory is assumed to include a sufficient number of stored video frames to allow the simultaneous reading of one video frame and writing of another video frame, as previously described. A default value is assigned to the read pointer (step 610) that corresponds to a location in the memory from which a video frame will be read. Following step 610, a vertical synchronization ("Vsync") signal is received (step 615). For example, the Vsync signal is received by the controller, the read control module, the frame rate control module, etc. The Vsync signal can indicate, among other things, that the display is ready to receive a new video frame for display, and can prevent the controller from providing frames to the display at a rate that exceeds the refresh rate of the display.

At step 620, a determination is made related to whether the read pointer should be advanced to the location of the next frame in memory. As previously described with respect to the frame rate control module and FIG. 2, determining whether a subsequent frame should be read from the memory depends upon, among other things, the number of frames or memory locations the read pointer is away from the write pointer. If the read pointer cannot be advanced, the process 600 returns to step 615 and receives another Vsync signal to indicate that the display is ready to receive another video frame. In such an instance, the read control module may provide the current frame (i.e., the current frame corresponding to the read pointer) to the display such that the same frame is displayed a second consecutive time. If, at step 620, the read pointer can be advanced, the read pointer is incremented (step 625), and the process 600 returns to step 615 to receive another Vsync signal from the display. Incrementing the read pointer includes, for example, incrementing an address location in memory, associating the read pointer with a new block of addresses in memory, associating the read pointer with a new frame stored in memory, etc.

Figure 8:
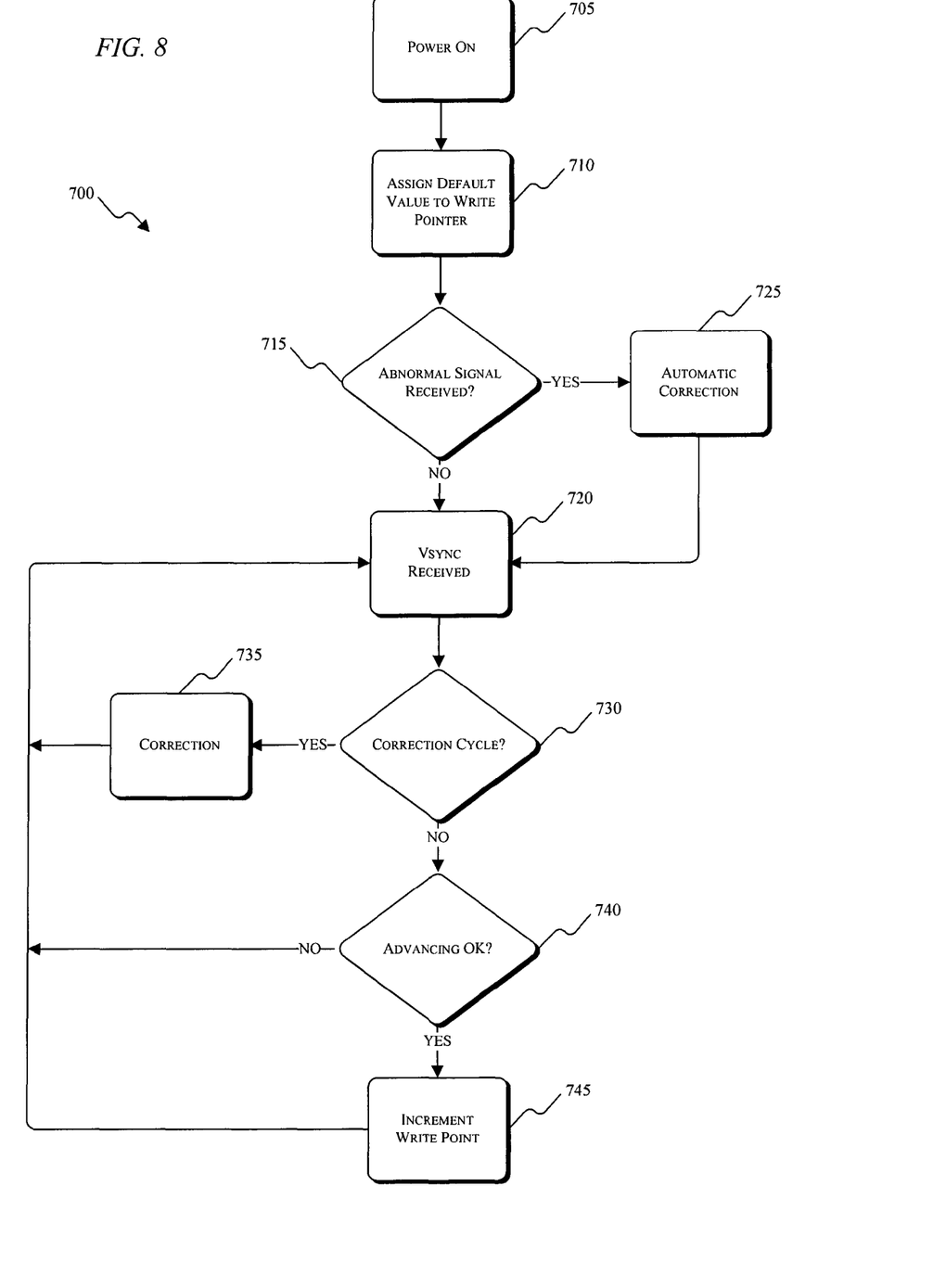
FIG. 8 illustrates a write process according to an embodiment of the invention.

FIG. 8 is a process 700 for writing a video frame to memory. Various steps described herein with respect to the process 700 are capable of being executed simultaneously or in an order that differs from the illustrated serial manner of execution. The process 700 begins at power on or startup (step 705). For descriptive purposes, the memory is assumed to include a sufficient number of stored video frames to allow the simultaneous reading of one frame and writing of another frame, as previously described. A default value is assigned to the write pointer (step 710) that corresponds to a location in the memory at which a video frame will be written. At step 715, a received input signal is evaluated to determine whether an abnormal signal (e.g., a weak signal that cannot be synced, etc.) has been received. If the received input signal is not abnormal, the process 700 proceeds to step 720 where the input sync signal is received and determined. If, at step 715, an abnormal signal has been received, an automatic correction can be performed (step 725). For example, a test signal generator within the controller generates a free-running test sync signal. The test sync signal is compared to the input sync signal. If the error between the input sync signal and the test sync signal is greater than or equal to a threshold value, the test sync signal can be used to synchronize the video input signal. Following automatic correction at step 725, the process 700 proceeds to step 720 with the selected sync signal.

At step 730, a second correction cycle can be selected. For example, if one or more predetermined criteria are satisfied that indicate the write operation requires correction, the process 700 proceeds to a correction module (step 735). The second correction cycle can be selected, for example, when a predetermined number of re-syncs have occurred (e.g., the write pointer is unable to advance a predetermined number of times). In such an instance, the controller may evaluate the location of the write pointer to prevent or reduce the likelihood of subsequent re-syncs. Additionally or alternatively, the second correction cycle can be selected based on an abnormal or weak signal in which no sync signal is received or the sync signal is corrupted. In such an instance, the controller may use the location of the read pointer to determine an appropriate sync location for the write pointer. If, at step 730, no additional correction cycles are required, the process 700 proceeds to step 740. At step 740, a determination is made related to whether the write pointer should be advanced, as previously described. If the controller determines that the write pointer should not be advanced, the process 700 returns to step 720 and another sync signal is received. If the write pointer can be advanced, the write pointer is incremented (step 745), and the process 700 proceeds to step 720 and awaits another sync signal. Incrementing the write pointer includes, for example, incrementing an address location in memory, associating the write pointer with a new block of addresses in memory, etc.

Thus, the invention provides, among other things, systems, methods, and computer readable media for synchronizing the display of a plurality of video input signals. Various features and advantages of the invention are set forth in the following claims.

The invention claimed is:

1. A video system comprising:
    a plurality of video sources corresponding to a plurality of input channels, the plurality of video sources configured to generate a plurality of video signals related to a plurality of video frames;
    a display including a plurality of display locations;
    a memory including a plurality of memory locations configured for storing the plurality of video frames, each of the memory locations corresponding to one of the plurality of display locations within the display; and
    a controller connected to the plurality of video sources, the display, and the memory, the controller configured to receive the plurality of video frames, the controller including
        a write control module including a write pointer, the write control module configured to write a first video frame to the memory, a second video frame to the memory, and a third video frame to the memory,
        a read control module including a read pointer, the read control module configured to read at least one of the first video frame, the second video frame, and the third video frame from the memory, and
        a frame rate control module configured to control writing operations of the write control module and reading operations of the read control module based on a read memory location of the read pointer with respect to a write memory location of the write pointer, wherein the frame rate control module synchronizes the read pointer with the write pointer to maintain the read memory location of the read pointer a set number of frames behind the write memory location of the write pointer,
    wherein the at least one of the first video frame, the second video frame, and the third video frame read from the memory by the read control module is displayed in a corresponding one of the plurality of display locations within the display.

2. The video system of claim 1, wherein the plurality of video frames associated with each of the plurality of video sources are independently written to the memory on a channel-by-channel basis.

3. The video system of claim 1, wherein the read memory location of the read pointer is maintained at least one frame behind the write memory location of the write pointer.

4. The video system of claim 3, wherein the read memory location of the read pointer is two frames behind the write memory location of the write pointer.

5. The video system of claim 1, wherein each of the first video frame, the second video frame, and the third video frame is displayed in the corresponding one of the plurality of display locations within the display.

6. The video system of claim 5, wherein the at least one of the first video frame, the second video frame, and the third video frame read from the memory corresponds to a common intermediate format ("CIF"), video graphics array ("VGA"), composite video ("CVBS"), red green blue ("RGB"), high-definition multimedia interface ("HDMI"), BT.1120 ("1080i"), or D1 signal.

7. The video system of claim 1, further comprising a remote device configured to receive the plurality of video signals.

8. A method of synchronizing video signals, the method comprising:
    receiving a plurality of video signals including a plurality of video frames;
    writing a first video frame, a second video frame, and a third video frame to a memory based on a write memory location of a write pointer, each of a plurality of memory locations being associated with one of a plurality of display locations within a display;
    reading at least one of the first video frame, the second video frame, and the third video frame from the memory based on a read memory location of a read pointer;

controlling writing operations and reading operations based on the read memory location of the read pointer with respect to the write memory location of the write pointer, wherein the read pointer is synchronized with the write pointer such that the read memory location of the read pointer is maintained a set number of frames behind the write memory location of the write pointer; and displaying the at least one of the first video frame, the second video frame, and the third video frame read from the memory in a corresponding one of the plurality of display locations within the display.

9. The method of claim 8, wherein each of the plurality of video sources corresponds to an input channel, and the plurality of video frames associated with each of the plurality of video sources are independently written to the memory on a channel-by-channel basis.

10. The method of claim 8, wherein the read memory location of the read pointer is maintained at least one frame behind the write memory location of the write pointer.

11. The method of claim 10, wherein the read memory location of the read pointer is two frames behind the write memory location of the write pointer.

12. The method of claim 8, wherein each of the first video frame, the second video frame, and the third video frame is displayed in the corresponding one of the plurality of display locations within the display.

13. The method of claim 12, further comprising displaying a set of data associated with the video system as an on-screen display.

14. A device for processing a plurality of digital video signals from a plurality of video sources, the device comprising:

a memory including a plurality of memory locations corresponding to one of a plurality of display locations within a display;

a write control module including a write pointer;

a read control module including a read pointer; and a frame rate control module configured to control writing operations of the write control module and reading operations of the read control module based on a relationship between the read pointer and the write pointer, wherein the frame rate control module synchronizes the read pointer with the write pointer to maintain a read memory location of the read pointer a set number of frames behind a write memory location of the write pointer, wherein at least one of a first video frame and a second video frame is read from the memory according to a corresponding one of the plurality of display locations within the display.

15. The device of claim 14, wherein the frame rate controller is configured to modify a frame rate at which the at least one of the first video frame and the second video frame is read from the memory.

16. The device of claim 14, wherein the frame rate control module is further configured to prevent the read pointer from overlapping the write pointer.

17. The device of claim 14, wherein the first video frame and the second video frame are mapped to the plurality of display locations within the display.

18. The device of claim 14, wherein the write control module further includes one or more buffers.

19. The device of claim 18, wherein the one or more buffers are configured as a circular buffer.

20. The device of claim 14, wherein the first video frame and the second video frame are serially written to the memory.

* * * * *